(12) United States Patent
Saito et al.

(10) Patent No.: US 11,833,721 B2
(45) Date of Patent: Dec. 5, 2023

(54) RESIN MOLDING, PRINTER, AND METHOD FOR MANUFACTURING RESIN MOLDING

(71) Applicant: CANON KABUSHIKI KAISHA, Tokyo (JP)

(72) Inventors: Kosuke Saito, Kawasaki (JP); Yukiya Enokida, Kawasaki (JP); Kei Oikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/745,712

(22) Filed: May 16, 2022

(65) Prior Publication Data

US 2022/0274294 A1    Sep. 1, 2022

Related U.S. Application Data

(63) Continuation of application No. 15/846,025, filed on Dec. 18, 2017, now abandoned.

(30) Foreign Application Priority Data

Dec. 22, 2016   (JP) ................. 2016-249457

(51) Int. Cl.
| | |
|---|---|
| *B29C 37/00* | (2006.01) |
| *B29C 45/26* | (2006.01) |
| *B41J 29/13* | (2006.01) |
| *B29C 33/42* | (2006.01) |
| *B29C 45/00* | (2006.01) |
| *B29C 45/37* | (2006.01) |

(52) U.S. Cl.
CPC .......... *B29C 37/0053* (2013.01); *B29C 33/42* (2013.01); *B29C 45/0046* (2013.01); *B29C 45/263* (2013.01); *B29C 45/372* (2013.01); *B41J 29/13* (2013.01); *B29C 2045/0049* (2013.01); *B29C 2793/009* (2013.01); *B29C 2945/7616* (2013.01); *B29C 2945/76153* (2013.01); *B29C 2945/76461* (2013.01); *B29C 2945/76638* (2013.01); *B29C 2945/76645* (2013.01); *B29K 2995/0022* (2013.01)

(58) Field of Classification Search
CPC ... B29C 33/42; B29C 37/0053; B29C 45/263; B29C 45/0046; B29C 45/372; B41J 29/02; B41J 29/13; B32B 3/00; B32B 3/30

See application file for complete search history.

(56) References Cited

U.S. PATENT DOCUMENTS

| | | | | |
|---|---|---|---|---|
| 5,654,115 A | * | 8/1997 | Hasebe | B22F 9/10 429/219 |
| 10,252,453 B2 | * | 4/2019 | Moriya | B29C 45/0025 |
| 2019/0142574 A1 | * | 5/2019 | Quirós | A61F 2/12 623/8 |

FOREIGN PATENT DOCUMENTS

JP     2009-134271    *  6/2009

* cited by examiner

*Primary Examiner* — Mathieu D Vargot
(74) *Attorney, Agent, or Firm* — Canon U.S.A., Inc. IP Division

(57) ABSTRACT

A resin molding has a first surface and a second surface, wherein the second surface includes a rib, and wherein the first surface includes a glossy portion and a non-glossy portion.

13 Claims, 12 Drawing Sheets

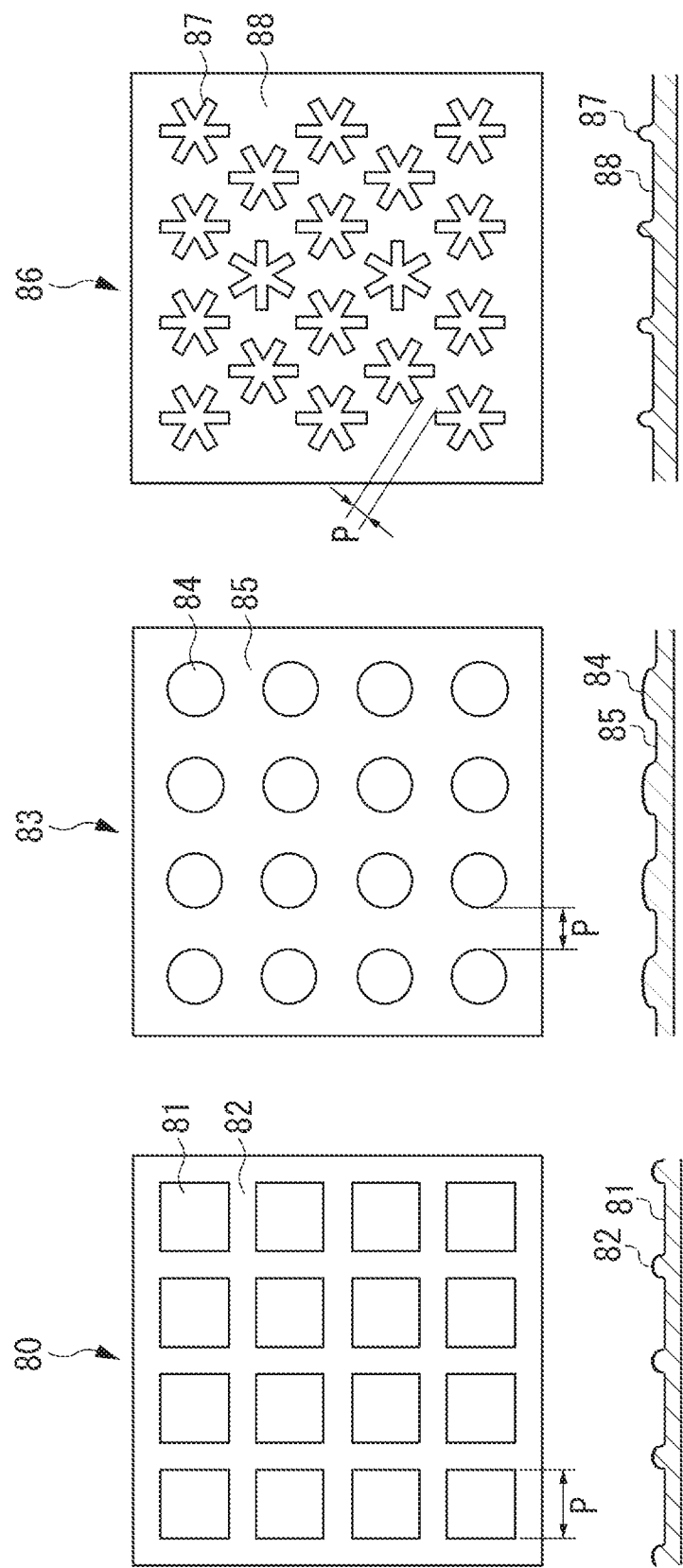

RESIN MOLDING, PRINTER, AND METHOD FOR MANUFACTURING RESIN MOLDING

CROSS-REFERENCE TO RELATED APPLICATIONS

This application is a continuation, and claims the benefit, of U.S. patent application Ser. No. 15/846,025, filed on Dec. 18, 2017, now abandoned, and claims the benefit of Japanese Patent Application No. 2016-249457, filed Dec. 22, 2016, which are hereby incorporated by reference herein in their entirety.

BACKGROUND

Field of the Disclosure

The present disclosure relates to a resin molding including a glossy portion and a non-glossy portion on an exterior surface of the resin molding. More specifically, the present disclosure relates to a plate-like resin molding having a front surface which is an exterior surface, and a back surface which is a non-exterior surface having recesses and protrusions.

Description of the Related Art

On a non-exterior surface of a plate-like or box-like resin molding used for, for example, a printer, recesses and protrusions such as rib-like projections for reinforcement and positioning or a difference in level caused by an ejector pin may be present. The "non-exterior surface" refers to a surface on the back of an exterior surface, and the "exterior surface" refers to a surface of which the exterior requires a certain grade because the surface meets the eyes of a user.

A resin used for the resin molding often mainly contains rubber such as acrylonitrile butadiene styrene (ABS) or high impact polystyrene (HIPS). When injection molding is performed using the resin, the shape of rubber in the resin injected into a cavity of a metal mold from an injection gate deforms from a circle to an ellipse due to flow pressure. However, in a case where recesses and protrusions are present on the non-exterior surface, the flow of the resin is disturbed in this recess/protrusion portion, and the pressure on the rubber weakens. Consequently, the rubber results in a shape close to a circle without deforming. Thus, the shape of the rubber partially differs in the region of the recesses and protrusions on the non-exterior surface. Thus, a portion having reduced glossiness termed unevenness occurs around the exterior surface on the back of the recesses and protrusions. In recent years, to improve design quality, a glossy exterior such as a lustrous black exterior is needed. In such an exterior, the unevenness portion having reduced glossiness is more likely to be conspicuous.

As a method for avoiding the unevenness, there exist methods for forming a crimp pattern on the exterior surface (the "crimp pattern" refers to a minute pattern (recesses and protrusions) provided on the exterior surface, and this pattern is occasionally referred to simply as "crimps"). The crimps, however, also reduce glossiness. Thus, the desired glossiness cannot be accomplished. Further, there is also a method for adjusting the temperature of the metal mold or the temperature of the resin. If the temperature of the resin becomes high, the rubber deformed to an ellipse when the injection molding is performed returns to a circle. Consequently, it is possible to eliminate partial differences in the shape of the rubber and therefore avoid the unevenness. If, however, the temperature of the metal mold or the temperature of the resin is high temperature, the molding cycle is lengthened, and productivity deteriorates.

Japanese Patent Application Laid-Open No. 2014-000770 discusses a method for forming minute and regular recesses and protrusions on an undulating surface having high glossiness. This method can represent an excellent texture by the high-glossy surface, and has the effect of making a molding defect such as a sink mark, a weld line, or a flow mark less conspicuous by the regular recesses and protrusions.

In the method discussed in Japanese Patent Application Laid-Open No. 2014-000770, however, the roughness and the glossiness of the entirety of a resin molding are uniform. Thus, the unevenness still exists.

SUMMARY

According to an aspect of the present disclosure, a resin molding includes a first surface, and a second surface, wherein the first surface includes a glossy portion and a non-glossy portion, and the second surface includes a rib.

According to another aspect of the present disclosure, a method for manufacturing a resin molding by injecting a resin into a cavity in a metal mold including a first metal mold and a second metal mold includes forming, in the first cavity, a shape from which a glossy portion having a glossiness of equal to or greater than 80% is transferred and a shape from which a non-glossy portion having a kurtosis value of equal to or greater than 3.5 is transferred, and forming, in the second cavity, a shape from which a rib is transferred.

Further features of the present disclosure will become apparent from the following description of exemplary embodiments with reference to the attached drawings.

BRIEF DESCRIPTION OF THE DRAWINGS

FIGS. 8A, 8B, and 8C are diagrams illustrating resin moldings, according to exemplary embodiments of the subject disclosure.

DESCRIPTION OF THE EMBODIMENTS

A resin molding according to an exemplary embodiment of the present disclosure will be described with reference to the drawings.

Figure 1:
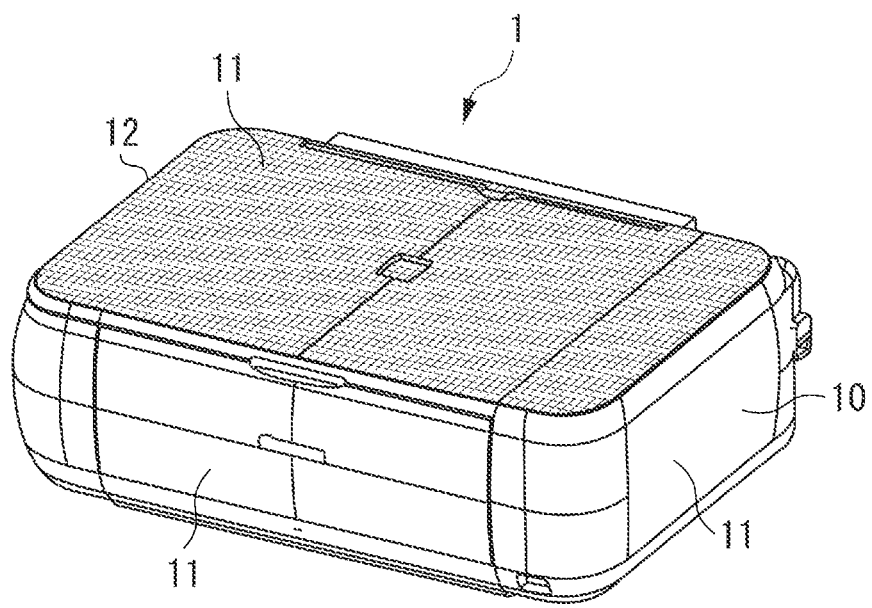
FIG. 1 is a perspective view illustrating a printer including a document reader according to an exemplary embodiment of the subject disclosure.
Figure 2:
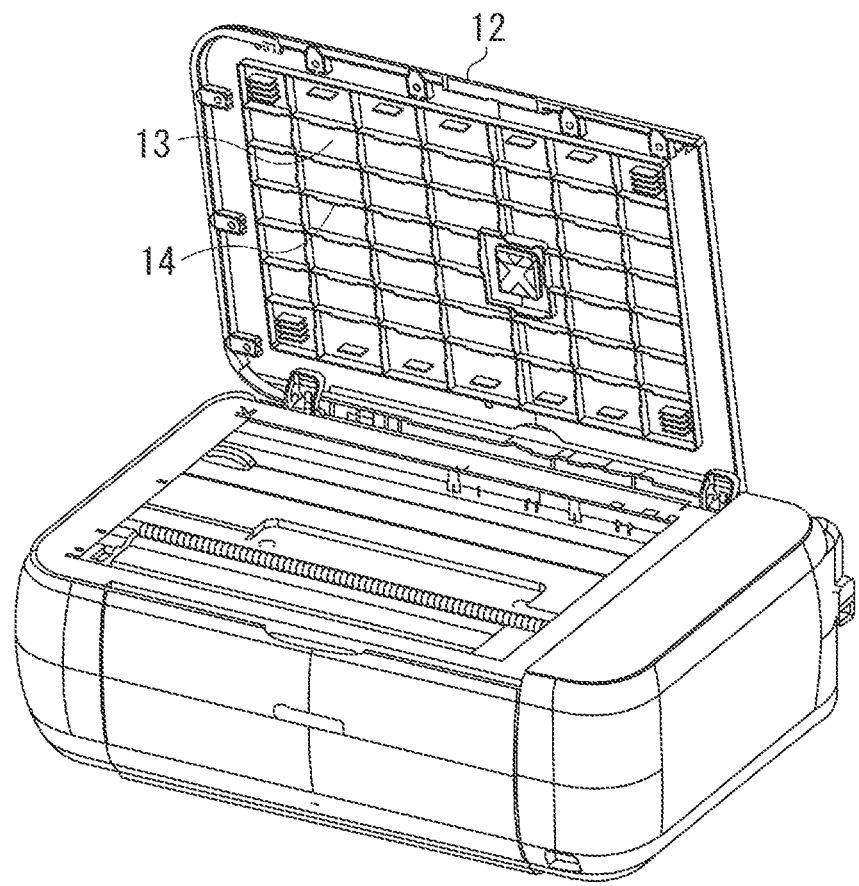
FIG. 2 is a perspective view illustrating a state where a document platen cover of the printer illustrated in FIG. 1 is opened, according to an exemplary embodiment of the subject disclosure.

The resin molding according to the present disclosure is a plate-like resin molding having a first surface and a second surface and is used for, for example, the exterior of a household electrical appliance product or an electronic device product, or an exterior part or an interior part of a vehicle such as an automobile, which requires a high-grade exterior. An example is illustrated where the resin molding is used for a printer including a document reader as the exemplary embodiment of the present disclosure. FIG. 1 is a perspective view of the printer including the document reader for which the resin molding according to the present disclosure is used as an example of the exemplary embodiment of the present disclosure. In FIG. 1, a multifunction printer 1 includes a document platen cover 12 and a housing 10, which forms a main body. The document platen cover 12 and the housing 10 are molded with a black resin, for example. Further, a first surface (exterior surface) 11, which meets the eyes of a user, requires a high-grade exterior. FIG. 2 is a perspective view of the state where the document platen cover of the printer including the document reader is opened. A second surface 13 (non-exterior surface) of the document platen cover 12 includes a rib 14, which is a projection protruding from the second surface 13. In the specification, the first surface 11 will occasionally be referred to as an "exterior surface", and the second surface 13 will occasionally be referred to as a "non-exterior surface". Further, in the specification, "plate-like" may refer to either a case where either the first or the second surface is a planar surface, or a case where both the first and second surfaces are planar surfaces. Alternatively, either the first or second surface may be a curved surface, or both the first and second surfaces may be curved surfaces. Further, the effects of the present disclosure are remarkably exerted in a resin molding in which the distance between the first and second surfaces is equal to or less than 3 mm. Further, the effects of the present disclosure are remarkably exerted in a resin molding in which the cross section of the rib 14 when cut along a surface parallel to the second surface 13 is a rectangle or a shape obtained by chamfering corner portions of a rectangle. Further, in a case where the cross section is a rectangle, the effects of the present disclosure are remarkably exerted if the length of each short side of the rectangle is less than 2 mm, and the length of each long side of the rectangle is equal to or greater than 1 cm. Alternatively, in a case where the cross section is a shape obtained by chamfering corner portions of a rectangle, the effects of the present disclosure are remarkably exerted if the length of each short side of the rectangle is less than 2 mm and the length of each long side of the rectangle is equal to or greater than 1 cm on the assumption that the corner portions are not chamfered.

Figure 3A:
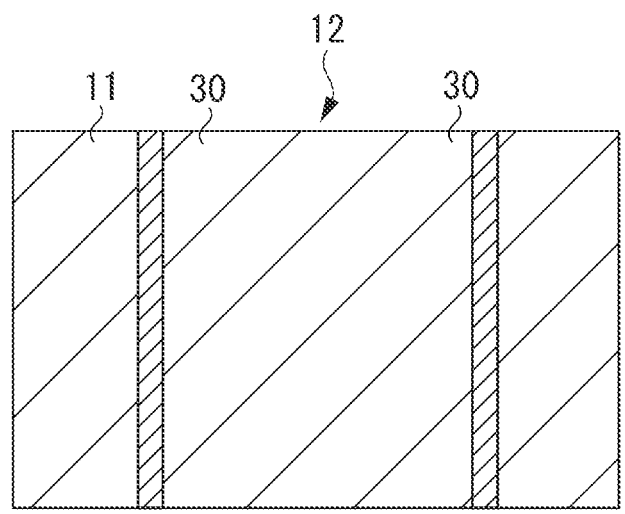
FIGS. 3A and 3B are diagrams illustrating unevenness, according to an exemplary embodiment of the subject disclosure.
Figure 3B:
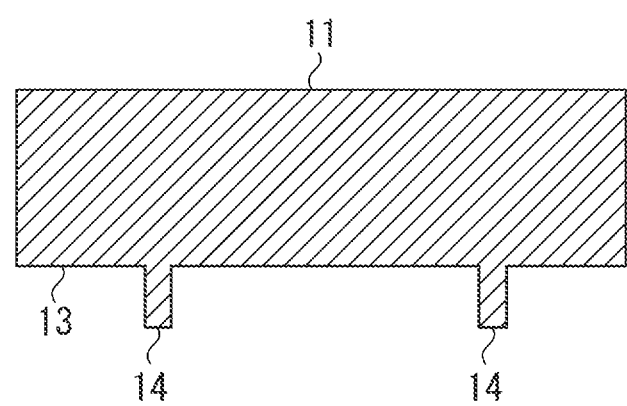

FIG. 3A is a diagram illustrating a partial enlarged view of a conventional document platen cover and illustrates unevenness occurring on the exterior surface 11 under the influence of a rib 14 of the non-exterior surface 13. FIG. 3B illustrates a partial cross-sectional view of the conventional document platen cover. A document platen cover 12 is molded by injection molding. Although a manufacturing method will be described in detail below, the document platen cover 12 is manufactured by injection-molding a material in which rubber particles are included in a resin, such as acrylonitrile butadiene styrene (ABS) and high impact polystyrene (HIPS), into a cavity in a metal mold from a gate. When the material is injection-molded, rubber included in the resin injected into the cavity from the gate deforms from a circle to an ellipse along the flow direction of the resin. Meanwhile, if the resin reaches a shape (a groove shape) formed in the cavity to form the rib 14 of the non-exterior surface 13, the resin flows also into the groove, and the flow of the resin is disturbed in the groove. When the resin flows into the groove formed in the cavity to form the rib 14, the pressure of the resin is temporarily released. Thus, the elliptical shape of the deformed rubber results in a shape close to the original circle. Consequently, the shape of the rubber differs only in a portion of the exterior surface 11 on the back of the rib 14 of the non-exterior surface 13 of the molded molding. Then, as illustrated in FIGS. 3A and 3B, the glossiness of the portion is reduced, and the portion is visually recognized as unevenness 30.

The exterior surface 11 requires a high-grade surface. Thus, in the present exemplary embodiment, to make the unevenness 30 inconspicuous, a glossy portion having high glossiness and a non-glossy portion having glossiness lower than that of the glossy portion are provided on the exterior surface 11. It is more desirable that the non-glossy portion should be more raised than the glossy portion. However, even if the non-glossy portion is on the same plane as the glossy portion or is more recessed than the glossy portion, it is possible to make the unevenness 30 less conspicuous than a surface having only the glossy portion.

Figure 4:
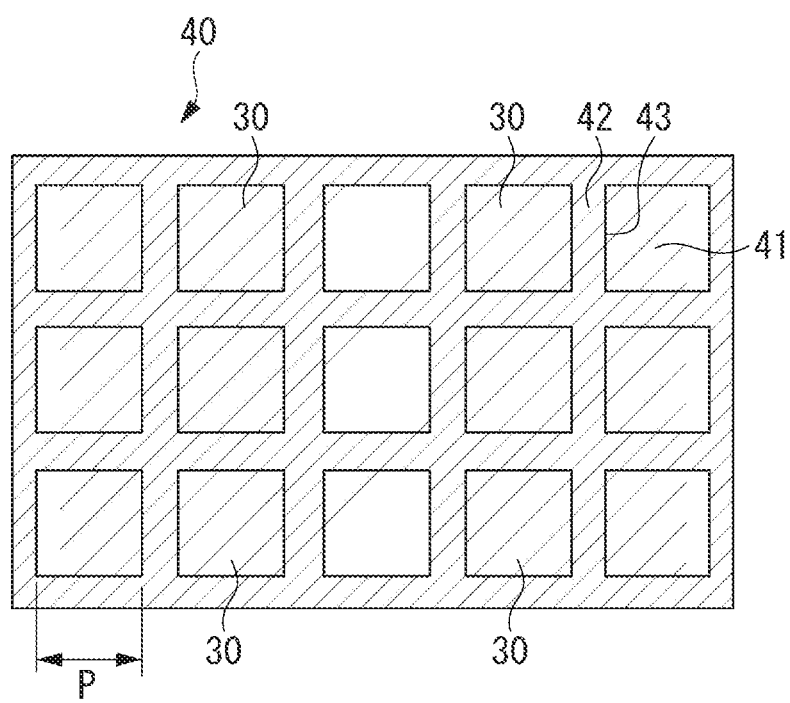
FIG. 4 is a diagram illustrating a grid pattern according to the exemplary embodiment of the subject disclosure.

FIG. 4 is a diagram illustrating an exterior surface 11 according to the present exemplary embodiment. The exterior surface 11 requires a high-grade surface. Thus, to make unevenness 30 inconspicuous, a resin molding 40 includes a glossy portion 41, which is a flat surface, and a non-glossy portion 42, which is raised from the glossy portion 41. In the present exemplary embodiment, an example is described where the exterior surface 11 includes the non-glossy portion 42 raised from the glossy portion 41. The present disclosure, however, is not limited to this. A glossy portion having high glossiness and a non-glossy portion having glossiness lower than that of the glossy portion may only need to be provided. That is, even if the non-glossy portion is on the same plane as the glossy portion or is more recessed than the glossy portion, it is possible to make the unevenness 30 less conspicuous than a surface having only the glossy portion. It is desirable that the glossiness of the glossy portion 41 should be equal to or greater than 80% and equal to or less than 100%. The glossiness of the glossy portion 41 is equal to or greater than 80%, whereby it is possible to obtain an excellent texture (a high-grade surface). In the specification, glossiness is a value measured using a gloss meter based on mirror surface glossiness at a reflection angle of 60° in JIS Z 8741. More specifically, "glossiness" refers to a numerical value obtained by setting a handy gloss meter PG-1 manufactured by Nippon Denshoku Industries Co., Ltd. to a reflection angle of 60° and pressing a measurement switch with a photometric portion of the gloss meter placed on a glossy portion of a molding.

The present disclosure is directed to, for example, making a non-glossy grid-like pattern (grid pattern) illustrated in FIG. 4 conspicuous to make the unevenness 30 inconspicuous, thereby reducing an exterior defect due to the unevenness 30. To make the grid-like pattern conspicuous, the difference in glossiness between the glossy portion 41 and the non-glossy portion 42 is made great. The difference in glossiness being great means that there is a contrast. Thus, it is easy to visually recognize the grid pattern, while it is difficult to visually recognize the unevenness 30 (the unevenness 30 is inconspicuous). It is desirable that the kurtosis value (Sku) of the non-glossy portion 42 should be equal to or greater than 3.5. The effects of the present disclosure are exerted if the kurtosis value is equal to or greater than 3.5. In manufacturing, however, it is difficult to produce a shape having a kurtosis value exceeding 50.0. Thus, it is more desirable that the kurtosis value should be equal to or greater than 3.5 and equal to or less than 50.0. Further, it is found that the non-glossy portion 42 has a grid pattern, whereby the effects are more remarkably exerted in a resin molding in which the cross section of a rib formed on a second surface when cut along a surface parallel to the second surface is a rectangle or a shape obtained by chamfering corner portions of a rectangle. It is considered that this is because a part of the shape of the non-glossy portion 42 is similar to the shape of the rib, and therefore, the rib is likely to be hidden in the pattern of the non-glossy portion 42. In a case where the cross section of the rib when cut along a surface parallel to the second surface is a rectangle, the effects are more exerted if the length of each short side of the rectangle is less than 2 mm, and the length of each long side of the rectangle is equal to or greater than 1 cm. Alternatively, in a case where the cross section of the rib when cut along a surface parallel to the second surface is a shape obtained by chamfering corner portions of a rectangle, the effects are more exerted if the length of each short side of the rectangle is less than 2 mm and the length of each long side of the rectangle is equal to or greater than 1 cm on the assumption that the corner portions are not chamfered.

Figure 5:
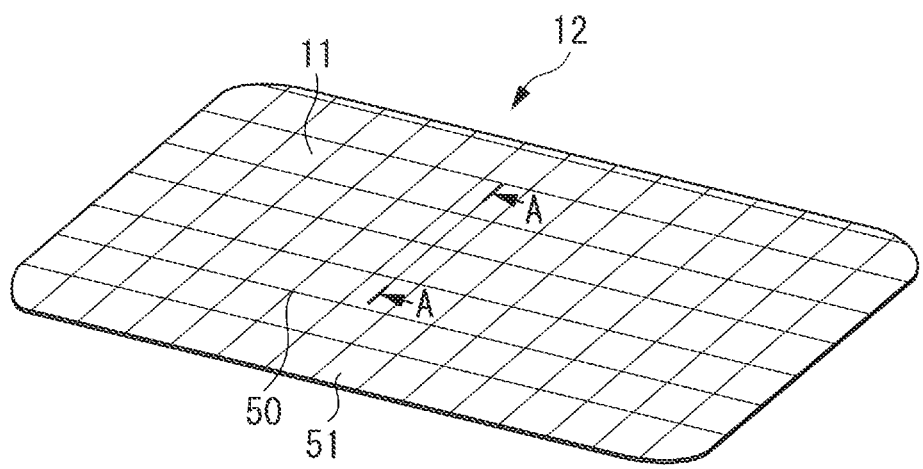
FIG. 5 is a diagram illustrating a document platen cover having the grid pattern according to the exemplary embodiment of the subject disclosure.
Figure 6:
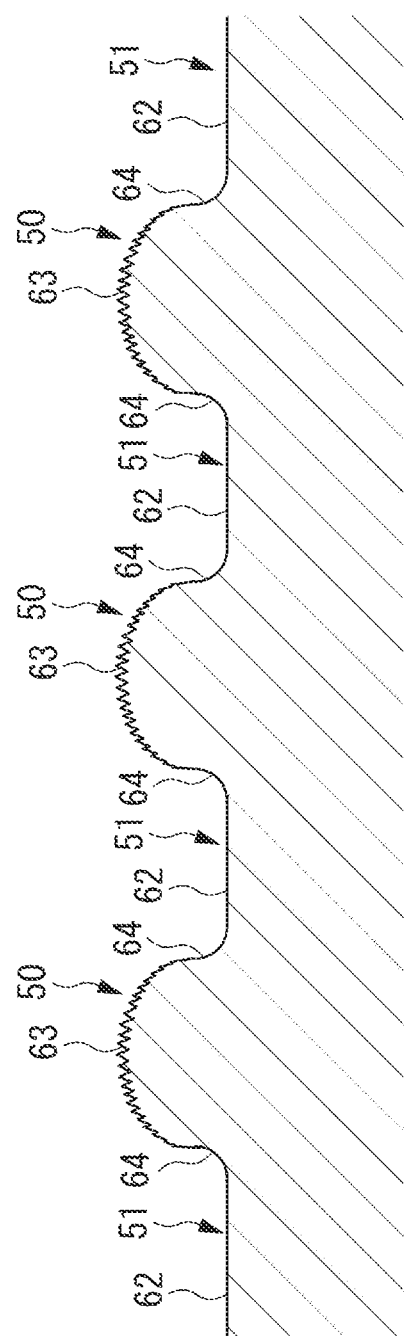
FIG. 6 is an A-A cross-sectional view of the document platen cover illustrated in FIG. 5, according to an exemplary embodiment of the subject disclosure.

FIG. 5 illustrates a document platen cover 12 in which a grid pattern is drawn on an exterior surface 11. FIG. 6 illustrates an A-A cross section of the document platen cover 12 in FIG. 5. To provide a contrast between a non-glossy portion 50 and a glossy portion 51, at least a part of a surface 63 of the non-glossy portion 50 is a non-glossy surface. To form the surface 63 of the non-glossy portion 50 as a non-glossy surface, the surface 63 may be formed so that light incident on the surface 63 is scattered. If the kurtosis value (Sku) of the surface 63 of the non-glossy portion 50 is equal to or greater than 3.5, it is possible to achieve such a surface. "Kurtosis (Sku)" is a surface property parameter defined in ISO25178 and is one of parameters indicating a height relative to a reference surface when a surface having the average height of a measured region is set as the reference surface. Particularly, kurtosis (Sku) indicates the degree of pointedness of a roughness shape and is calculated by the following formula (1).

[Math 1]

$$Sku = \frac{1}{Sq^4}\left[\frac{1}{A}\iint_A Z^4(x, y)dxdy\right] \quad \text{formula (1)}$$

[Math 2]

$$Sq = \sqrt{\frac{1}{A}\iint_A Z^2(x, y)dxdy} \quad \text{formula (2)}$$

Figure 7A:
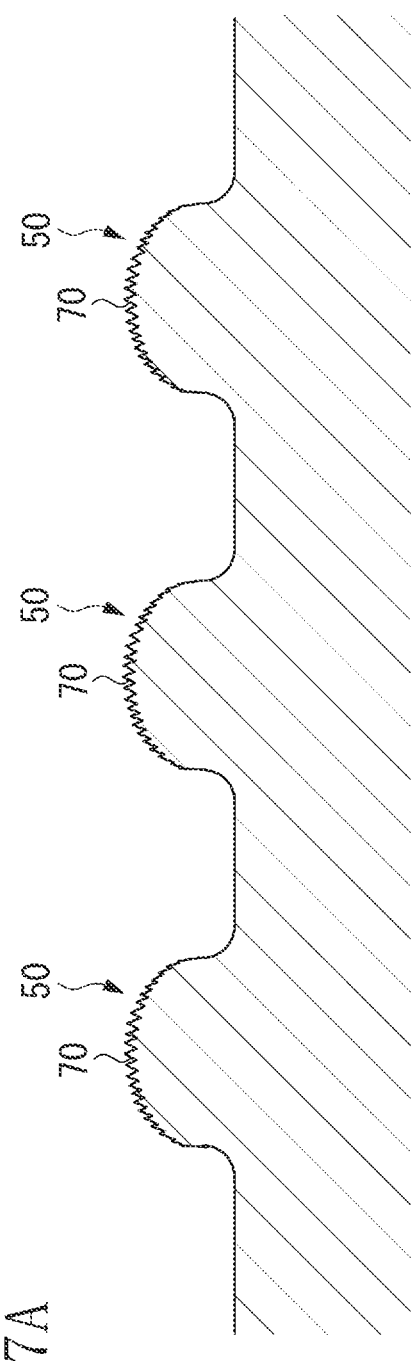
FIGS. 7A and 7B are diagrams illustrating a relationship between a kurtosis value and a shape according to the exemplary embodiment of the subject disclosure.
Figure 7B:
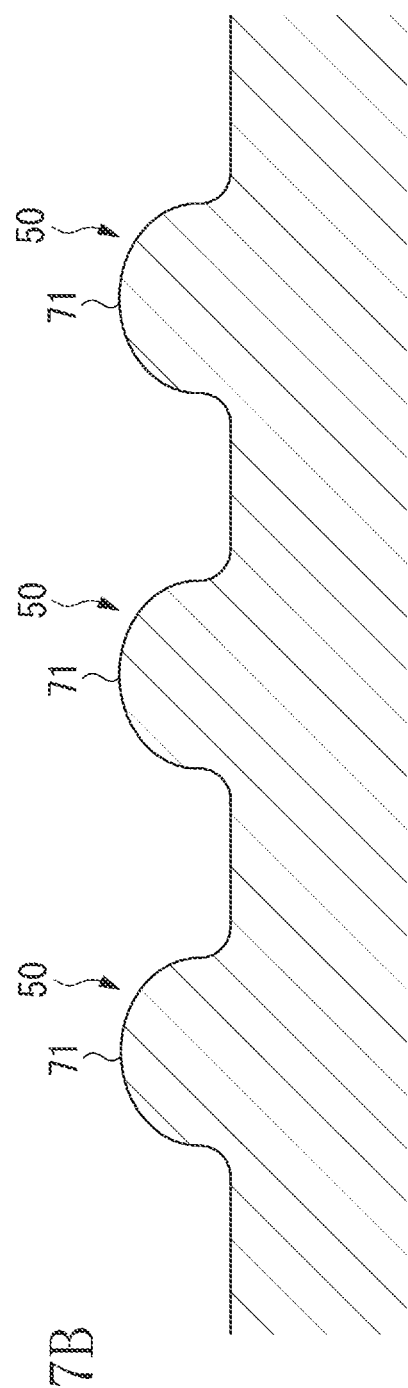

In formula (1), Sq is obtained by extending two-dimensional Rq (root mean square (rms)) to three dimensions and represents a standard deviation calculated by formula (2). Sq is a root-mean-square deviation obtained by dividing by a measurement area A the volume of a portion obtained by squaring the distance between a surface shape and a reference surface and of a portion surrounded by the reference surface, and then obtaining the square root of the division result. Z represents the height of the measured surface shape, and x and y represent the axes of the reference surface. FIGS. 7A and 7B illustrate the relationship between the kurtosis value (Sku) and the surface property. FIG. 7A illustrates a surface 70, of which the kurtosis value (Sku) is high, and FIG. 7B illustrates a surface 71, of which the kurtosis value (Sku) is low. As illustrated in FIGS. 7A and 7B, if the kurtosis value (Sku) is high, the height distribution of the surface 70 is pointed in a needle-like manner. If the kurtosis value (Sku) is low, the height distribution of the surface 71 is smooth. Light incident on the surface 70, of which the kurtosis value (Sku) is high, is scattered by the surface 70, which is pointed in a needle-like manner. Thus, the glossiness of the surface 70 is low. On the other hand, light incident on the surface 71, of which the kurtosis value (Sku) is low, is regularly reflected. Thus, the glossiness of the surface 71 is high. Thus, it is desirable that the kurtosis value of the non-glossy portion 50 should be high. Then, when the glossiness of the glossy portion 51 is equal to or greater than 80%, and if the kurtosis value of the non-glossy portion 50 is equal to or greater than 3.5, a contrast occurs, and the unevenness is less conspicuous. The kurtosis value (Sku) can be measured using a laser microscope manufactured by Keyence Corporation, for example. In the specification, the kurtosis value (Sku) is a numerical value measured using a shape analysis laser microscope VK-X100 manufactured by Keyence Corporation. More specifically, a non-glossy portion in a region of 0.5 mm×0.7 mm in a molding is measured using a 10-power objective lens. Then, 10 regions in the non-glossy portion are measured. Then, kurtosis values are calculated from the measurement results of the respective regions using a multi-file analysis application, which is dedicated analysis software, and the average value of the calculated values is defined as the kurtosis value.

Further, it is desirable that the non-glossy portion 50 should be raised from the glossy portion 51 by equal to or greater than 40 µm and less than 500 µm. If the non-glossy portion 50 is raised by equal to or greater than 40 µm, a fingerprint is less likely to be attached to the molding, which is more desirable. If the non-glossy portion 50 is raised by equal to or greater than 500 µm, a region where the glossy portion 51 is visible is small depending on the angle, and the sense of luxuriousness is reduced. That is, it is desirable that the difference in height between the glossy portion 51 and the non-glossy portion 50 should be equal to or greater than 40 µm and less than 500 µm. The difference in height between the glossy portion 51 and the non-glossy portion 50 is obtained by measuring the height of the non-glossy portion 50 using a white interferometer such that the glossy portion 51, which is a planar surface in the exterior surface 11, is a reference. In the specification, the difference in height between the glossy portion 51 and the non-glossy portion 50 is defined as the average value of values obtained by measuring 10 places in a region of 1.0 mm×1.4 mm in a molding with a 10-power objective lens, using a three-dimensional optical profiler NewView 7000 manufactured by Zygo Corporation.

Further, the more clearly visible the grid pattern, i.e., the clearer a ridge line 43 of the non-glossy portion 42, the more excellent effects are exerted. More specifically, the smaller the numerical value of the radius of curvature of the cross section of a boundary portion of the non-glossy portion 50 and the glossy portion 51, i.e., a base portion 64 of the non-glossy portion 50 adjacent to the glossy portion 51, the more clearly the ridge line 43 of the grid pattern is visually recognized. In the specification, the boundary portion of the non-glossy portion 50 and the glossy portion 51 will occasionally be referred to as a "base portion". Conversely, if the radius of curvature of the base portion 64 is large, the ridge line 43 of the grid pattern seems blurry. Thus, it is desirable that the radius of curvature of the base portion 64 should be small, because the unevenness is less conspicuous. Particularly, if the radius of curvature of the base portion 64 is equal to or less than 20 µm, the ridge line 43 of the grid pattern is more clearly visible. The radius of curvature of the base portion 64 is calculated by measuring the profile of the base shape of the non-glossy portion 50 using a laser microscope manufactured by Keyence Corporation, for example, and then approximating the profile to a circular arc by the method of least squares. In the specification, the radius of curvature of the base portion 64 is a numerical value measured using a shape analysis laser microscope VK-X100 manufactured by Keyence Corporation. More specifically, the radius of curvature of the base portion 64 is defined as a value obtained by measuring 10 places in a region of 0.5 mm×0.7 mm in a molding with a 10-power objective lens, calculating the profile of a base portion in each measurement region and the radius of curvature of an approximate circular arc of the profile using a multi-file analysis application, which is dedicated analysis software, and averaging the calculated radii of curvature.

In the case of the grid pattern illustrated in FIG. 4, it is desirable that a width P of the glossy portion 41 should be equal to or greater than 0.063 mm and equal to or less than 4.0 mm. It is known that when a person with normal eyesight views the resin molding 40, the shortest width that enables the person to visually recognize the glossy portion 41 is about 0.063 mm. Based on this, if the width P of the glossy portion 41 is less than 0.063 mm, it is difficult to visually recognize the glossy portion 41 and distinguish the grid pattern. This also results in reducing the effect that the unevenness 30 is less conspicuous. Further, if the width P of the glossy portion 41 is greater than 4.0 mm, the glossy surface of the glossy portion 41 is emphasized, and it is more difficult to visually recognize the grid pattern. This, therefore, also reduces the effect that the unevenness 30 is less conspicuous. Thus, it is desirable that the pitch of the grid of the grid pattern should be equal to or greater than 0.063 mm and equal to or less than 4.0 mm.

In the present exemplary embodiment, an example is illustrated where a person is caused to visually recognize the grid pattern on the exterior surface 11 using the glossy portion 41 and the non-glossy portion 42. The present disclosure, however, is not limited to the grid pattern. That is, any pattern may be used so long as a person can be caused to visually recognize the pattern based on the non-glossy portion 42 on the exterior surface 11 by the placement of the glossy portion 41 and the non-glossy portion 42. If, however, the non-glossy portion 42 has a repetitive pattern, it is easy to process the glossy surface when manufacturing the resin molding 40, which is suitable. FIGS. 8A, 8B, and 8C illustrate plan views of examples of the repetitive pattern. FIG. 8A illustrates an example of the grid pattern used in the present exemplary embodiment. FIG. 8B illustrates a polka-dot pattern, which is a set of circles, and FIG. 8C illustrates a snowflake pattern. The present disclosure, however, is not limited to these patterns. Alternatively, for example, a set of polygons such as triangles or rectangles may be used. Yet alternatively, concentric circles or character shapes may be used. The glossy portion 51 and the non-glossy portion 50 may only need to be alternately placed.

As the material to be used for the resin molding, any material including rubber particles, such as ABS or HIPS, can be used without limitation.

According to the present exemplary embodiment, a non-glossy portion raised from a glossy portion is formed, whereby light incident on the non-glossy portion is scattered, and a contrast occurs between the non-glossy portion and the glossy portion. Thus, the raised non-glossy portion can camouflage unevenness occurring on an exterior surface, thereby making it difficult to visually recognize the unevenness.

Next, a method for manufacturing the resin molding according to the present exemplary embodiment is described.

Figure 9:
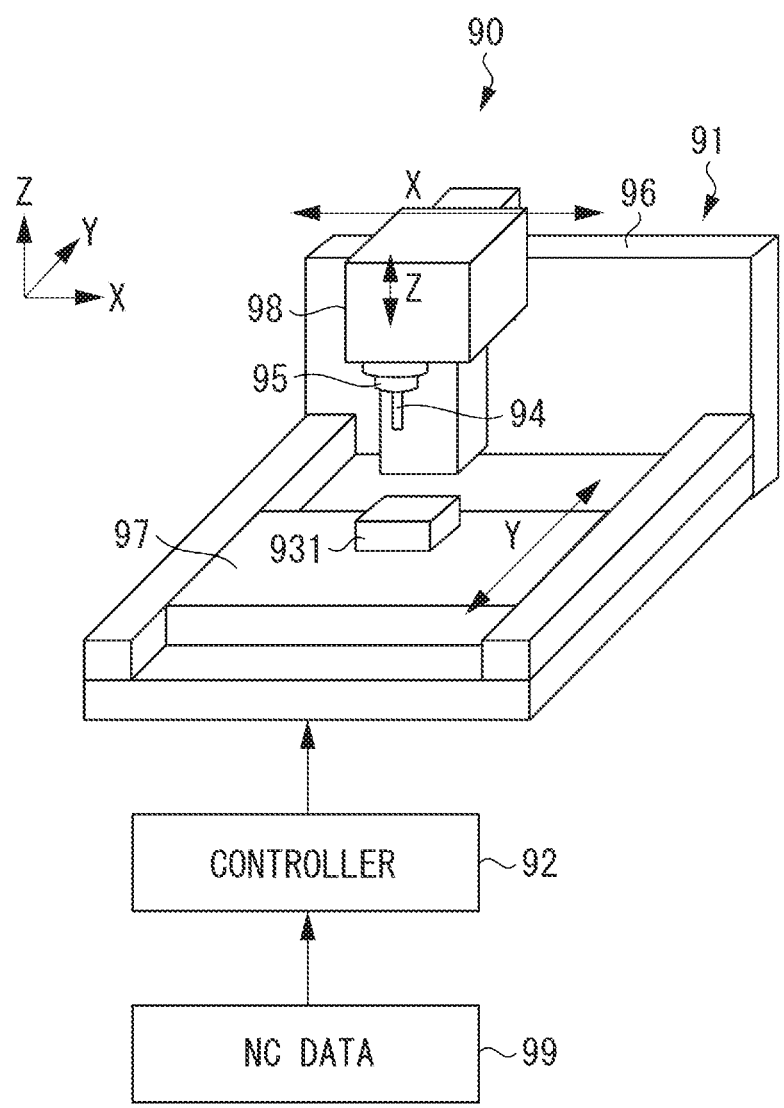
FIG. 9 is a diagram illustrating a machining center for processing a metal mold according to the exemplary embodiment of the subject disclosure.

The resin molding according to the present exemplary embodiment is molded by injection-filling a cavity formed in a first metal mold and a second metal mold with a resin from a gate. FIG. 9 is a diagram illustrating a machining center 90 for processing the first metal mold and the second metal mold according to the exemplary embodiment. A machining center 90 includes a processing machine main body 91 and a controller 92. The first metal mold and the second metal mold may be formed of a plurality of pieces (a piece will occasionally be referred to as a "cavity piece" in the specification). If the cavity is formed of pieces, even a molding having a complex shape can be processed by dividing a transfer surface. Thus, it is possible to reduce the manufacturing cost of the metal mold.

The processing machine main body 91 performs cutting on a first metal mold (cavity piece) 931 (or a second metal mold 932), which is a processing target object, thereby manufacturing a metal mold. The processing machine main body 91 includes a spindle 95, which is a main shaft for supporting a cutting tool 94, an X-stage 96, a Y-stage 97, and a Z-stage 98.

It is desirable that an end mill should be used as the cutting tool 94. The spindle 95 rotates the cutting tool 94 about a Z-axis. The Z-stage 98 supports the spindle 95 and moves the cutting tool 94 in a Z-direction relative to the first metal mold 931 (or the second metal mold 932). Similarly, the X-stage 96 moves the cutting tool 94 in an X-direction relative to the first metal mold 931 (or the second metal mold 932), and the Y-stage 97 moves the cutting tool 94 in a Y-direction relative to the first metal mold 931 (or the second metal mold 932). Thus, the processing machine main body 91 can move the front end of the cutting tool 94 in the XYZ directions relative to the first metal mold 931 (or the second metal mold 932) while rotating the cutting tool 94.

The controller 92 includes a computer including a central processing unit (CPU) and a memory and controls the processing machine main body 91 according to numerical control (NC) data 99. The NC data 99 includes various instructions for use in cutting, such as the amount of movement in the X-direction, the amount of movement in the Y-direction, the amount of movement in the Z-direction, the rotational speed of the main shaft, the feeding rate in the X-direction, the feeding rate in the Y-direction, and the moving speed in the Z-direction. Under control of the controller 92, the cutting tool 94 is moved relative to the first metal mold 931 (or the second metal mold 932) while being rotated, whereby it is possible to perform cutting on the first metal mold 931 (or the second metal mold 932), thereby obtaining a three-dimensional shape based on the NC data 99.

Figure 10A:
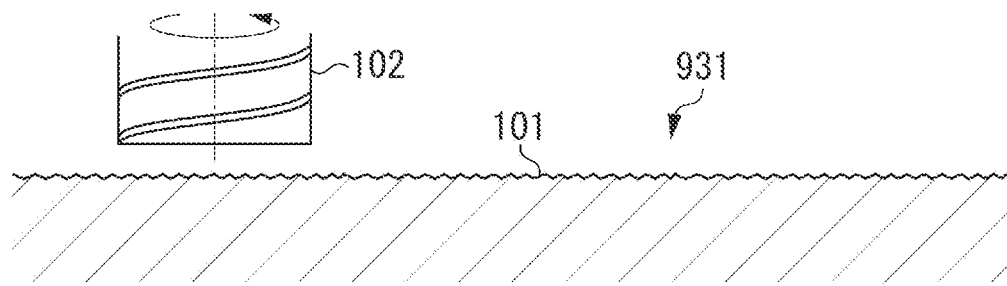
FIGS. 10A, 10B, and 10C are diagrams illustrating methods for manufacturing a metal mold for injection-molding a resin molding according to the exemplary embodiment.
Figure 10B:
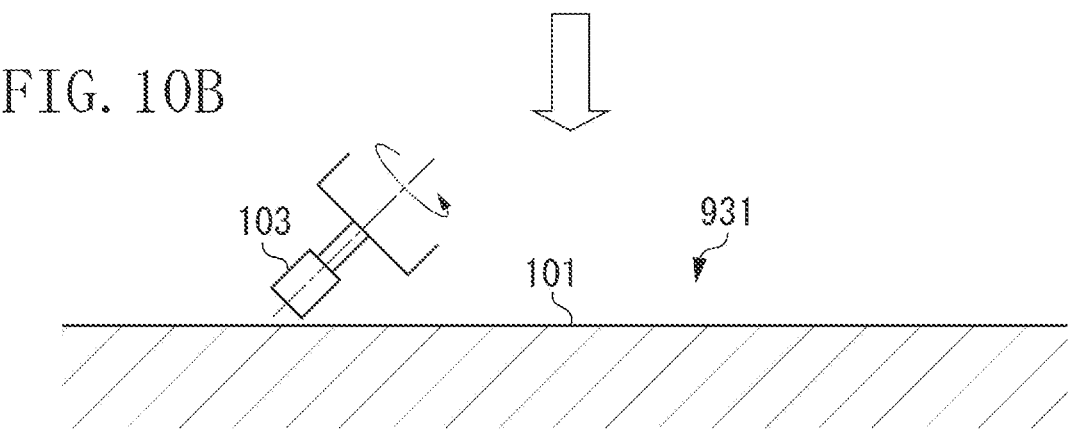
Figure 10C:
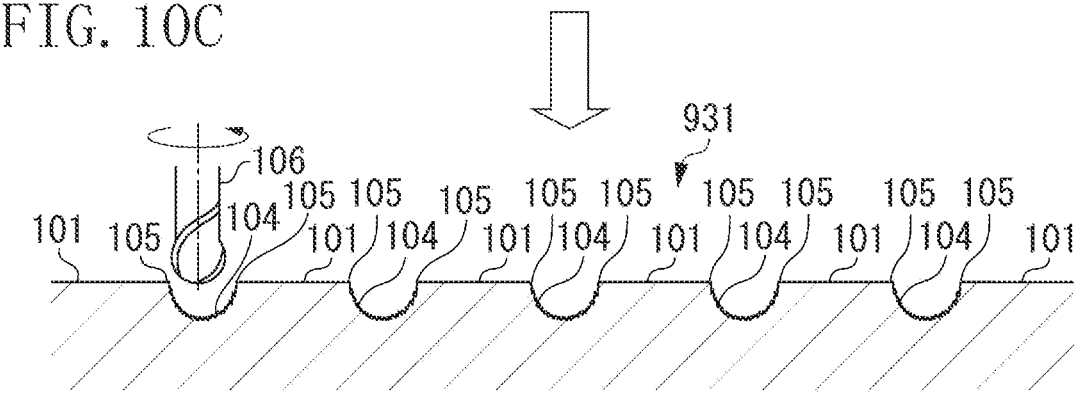

FIGS. 10A, 10B, and 10C illustrate the steps of manufacturing the first metal mold 931. FIG. 10A illustrates a first processing step. FIG. 10B illustrates a second processing step. FIG. 10C illustrates a third processing step. First, in the first processing step illustrated in FIG. 10A, a surface 101 of the first metal mold 931 is roughly processed. A radius end mill 102 is used as the cutting tool 94 in the machining center 90 illustrated in FIG. 9. The radius end mill 102 is cut into the surface 101 while being rotated, and is scanned, thereby performing cutting. At this time, to save the trouble when smoothing the surface 101 in the second processing step, it is desirable that the flatness of the surface 101 should be made equal to or less than 10 μm in the first processing step.

In the second processing step in FIG. 10B, the surface 101 of the first metal mold 931 is subjected to mirror surface finishing using a rotary polishing tool 103 and diamond paste. At this time, to prevent differences between the depths of recessed portions 104 when the recessed portions 104 are processed in the third processing step, it is desirable that the flatness of the surface 101 should be made equal to or less than 5 μm in the second processing step.

In the third processing step in FIG. 10C, the recessed portions 104 are processed on the surface 101 of the first metal mold 931 using a ball end mill 106. Similarly to the first processing step, the ball end mill 106 is cut into the surface 101 while being rotated, and is scanned, thereby performing cutting. Then, the shape of the ball end mill 106 is transferred to the first metal mold 931, thereby forming the recessed portions 104. At this time, the ball end mill 106 of which the material is cubic boron nitride (CBN) is used and rotated at 20000 revolutions per minute, thereby performing processing. Since CBN is the hardest next to diamond, the ball end mill 106, which is made of CBN, has a sharp edge. Thus, if the ball end mill 106 is used and rotated at high speed, it is possible to perform processing with excellent cutting quality and perform removal processing without plastically deforming the surface 101 of the first metal mold 931 when performing processing. Thus, a base portion 105 of each recessed portion 104 has an acute angle, and the radius of curvature of the base portion 105 is equal to or less than 20 μm. Further, when the recessed portion 104 is processed, it is desirable that the ball end mill 106 should be rotated at 20000 revolutions per minute and fed at 150 to 500 mm/min so that the kurtosis value (Sku) of the recessed portion 104 is equal to or greater than 3.5. This is because the ball end mill 106 is rotated at 20000 revolutions per minute and fed at 150 to 500 mm/min, whereby a cyclic shape is formed in the scanning direction, and the kurtosis value becomes high. Further, it is desirable that the ball end mill 106 should be scanned twice or more. At this time, in each scan, the position of the tool may be shifted by about 50 μm in a direction perpendicular to the scanning direction. This is because lines to be scanned are shifted, whereby minute projection shapes are formed in the sub-scanning direction, the roughness of the surface becomes great, and the kurtosis value becomes high.

Examples of the material of the first metal mold 931 and the second metal mold 932 to be subjected to the above processing include stainless steel. Alternatively, another material may be used in terms of processability and durability in injection molding.

Further, the second and third processing steps are performed in reverse order, whereby it is possible to manufacture a resin molding in which a glossy portion is raised from a non-glossy portion.

Figure 11A:
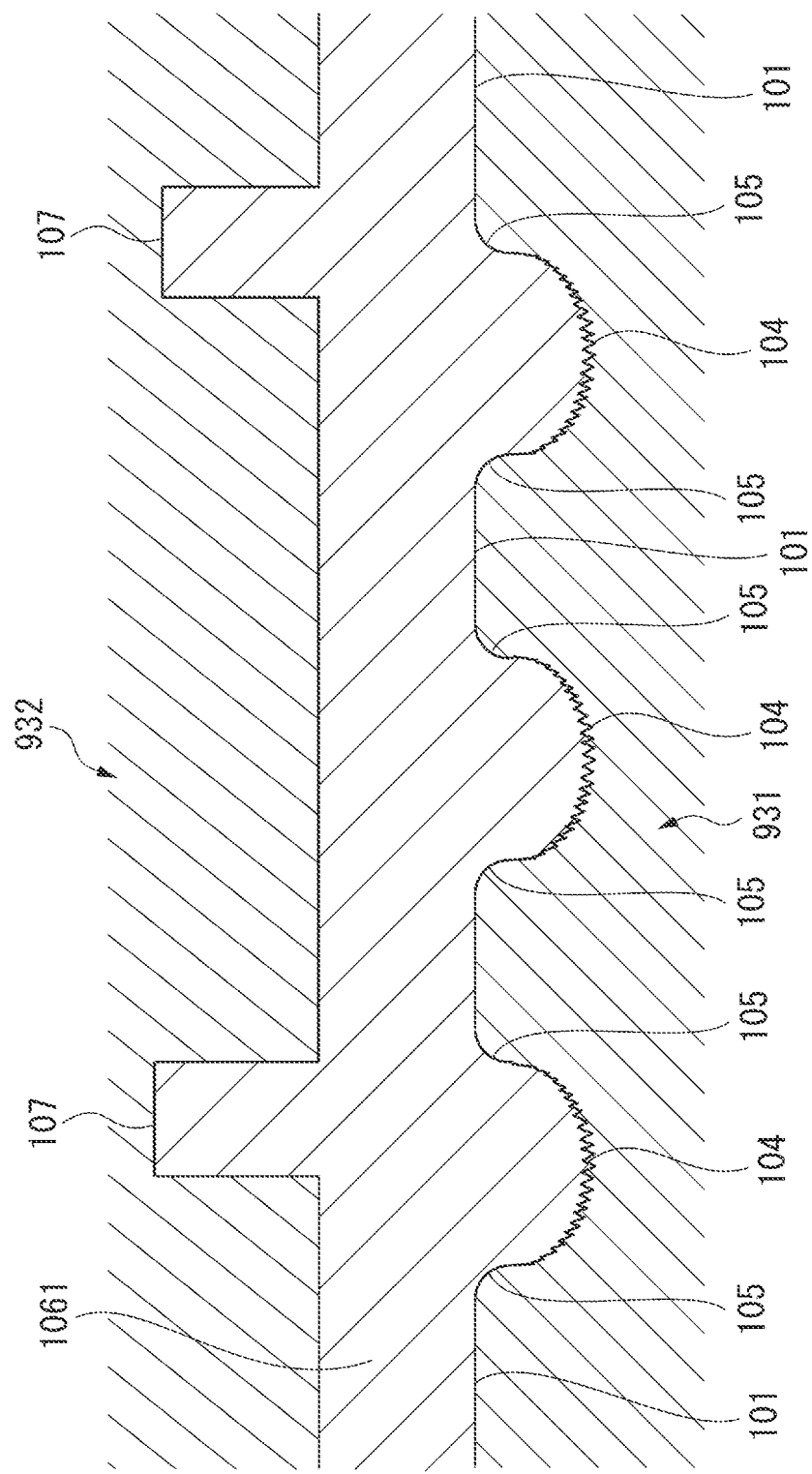
FIG. 11A illustrates a resin molding and metal molds, according to an exemplary embodiment of the subject disclosure.

FIG. 11A illustrates a resin molding and metal molds. An injection molding step is a known method. Injection molding is performed by injecting a resin 1061 into a cavity formed in the first metal mold 931 and the second metal mold 932 as illustrated in FIG. 11 using the first metal mold 931 and the second metal mold 932 manufactured as described above. The surface 101 of the first metal mold 931 illustrated in FIG. 11A has been subjected to mirror surface finishing. The kurtosis value (Sku) of the recessed portion 104 of the first metal mold 931 is equal to or greater than 3.5. The radius of curvature of the base portion 105 of the recessed portion 104 of the first metal mold 931 is equal to or less than 20 μm. Further, in the second metal mold 932, a shape 107 from which a rib is transferred is formed.

Figure 11B:
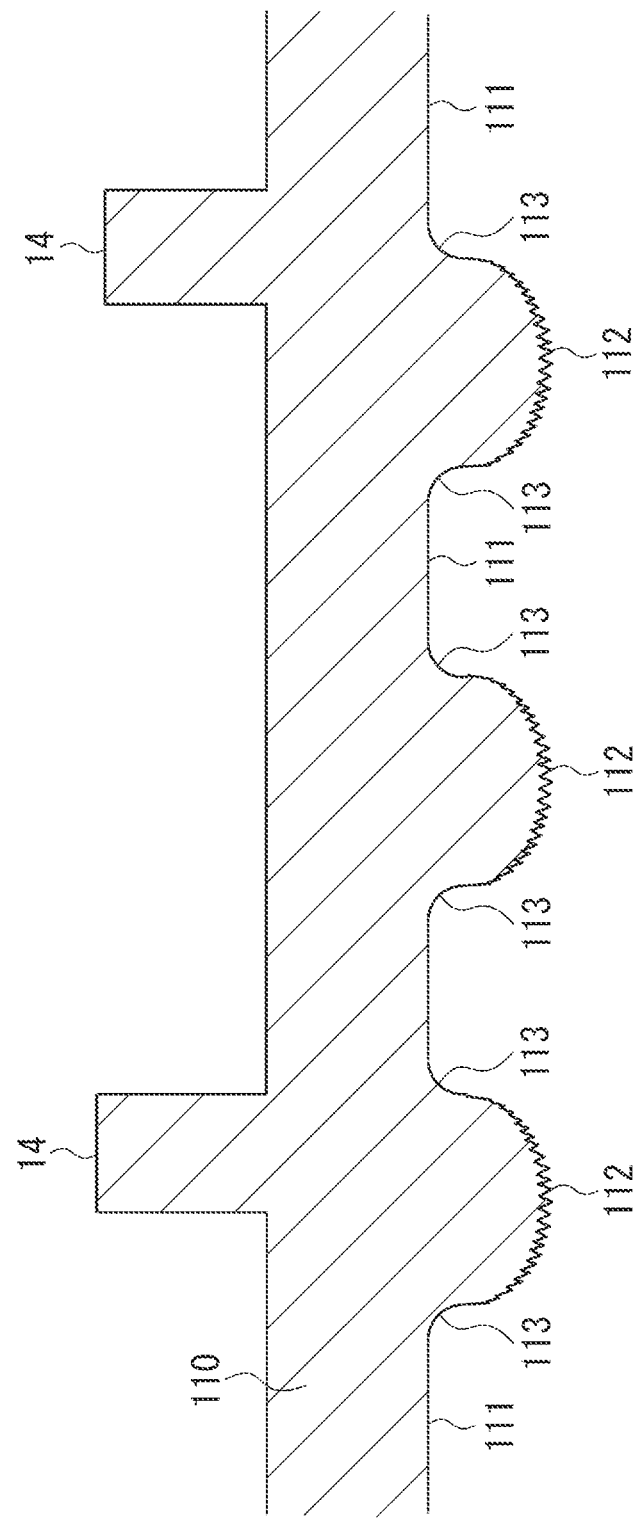
FIG. 11B illustrates a molding molded by the metal molds, according to an exemplary embodiment of the subject disclosure.

FIG. 11B illustrates a molding molded by the first metal mold 931 and the second metal mold 932. A resin molding 110 includes a glossy portion 111 and a non-glossy portion 112 on a first surface of the resin molding 110 and includes a rib on a second surface of the resin molding 110. Since the surface 101 of the first metal mold 931 has been subjected to mirror surface finishing, the glossiness of the glossy portion 111 of the resin molding 110, which is a transfer surface, is equal to or greater than 80%. Further, since the kurtosis value (Sku) of the recessed portion 104 of the first metal mold 931 is equal to or greater than 3.5, the kurtosis value (Sku) of the non-glossy portion 112 of the resin molding 110, which is a transfer surface, is also equal to or greater than 3.5. Consequently, the resin molding 110 includes the glossy portion 111, which is glossy, on its exterior surface, and thus can obtain a sense of luxuriousness.

Further, since the kurtosis value (Sku) of the non-glossy portion 112 is equal to or greater than 3.5, light incident on the non-glossy portion 112 is scattered, and a contrast occurs between the glossiness of the non-glossy portion 112 and the glossiness of the glossy portion 111. Thus, it is difficult to visually recognize unevenness occurring on the exterior surface.

Further, since the radius of curvature of the base portion 105 of the recessed portion 104 of the first metal mold 931 is equal to or less than 20 μm, the radius of curvature of a base portion 113 of the non-glossy portion 112 of the resin molding 110, which is a transfer surface, is also equal to or less than 20 μm. The radius of curvature of the base portion 113 of the non-glossy portion 112 is equal to or less than 20 μm, whereby a ridge line of the base portion 113 of the non-glossy portion 112 is clearly visually recognized, which is more desirable.

While the manufacturing method has been described, the manufacturing method is not limited to the above description.

Specific examples will be described below.

FIG. 8A is a top view of an exterior of a resin molding according to a first example. A grid pattern was formed on a plate-like resin molding 80 having a thickness of 1.6 mm. A width P of a glossy portion 81 was 1.4 mm. A height of a non-glossy portion 82 was 50 μm. Further, a rib having a width of 0.8 mm was provided on a non-exterior surface of the resin molding 80.

Stainless steel was used as the material of a metal mold. A radius end mill was attached to the machining center 90 illustrated in FIG. 9, and the metal mold was roughly processed. Then the metal mold was subjected to mirror surface finishing using a rotary polishing tool and diamond paste. Then, a recessed portion having an inverted shape of the non-glossy portion 82 was processed in the metal mold using a ball end mill. The recessed portion was processed by two scans, and in each scan, the position of the tool was shifted by 50 μm in a direction perpendicular to the scanning direction. In addition, the kurtosis value was changed to fall in a range from 3.0 to 5.0 while changing the feeding rate and the number of revolutions. Further, the metal mold was processed so that the radius of curvature of the cross section of a base portion was 2.0 to 30.0 μm.

Then, after the metal mold was manufactured, injection molding was performed, thereby obtaining the resin molding 80. As the resin material, black HIPS was used.

The exterior surface of the obtained resin molding 80 was visually observed by a person with normal eyesight to evaluate the visibility of unevenness. Table 1 illustrates the visibility of unevenness with respect to each kurtosis value and each radius of curvature of cross section of base portion. In table 1, the visibility of unevenness for a resin molding 80 in which the unevenness was inconspicuous if the resin molding was not carefully observed, i.e., the visibility of unevenness was low is indicated as "Low". Further, the visibility of unevenness for a resin molding 80 in which the conspicuousness of the unevenness was more reduced than in a resin molding 80, the visibility of unevenness for which is indicated as "Low", i.e., the visibility of unevenness was further low is indicated as "Very low". As illustrated in table 1, if the kurtosis value (Sku) of the non-glossy portion 82 of the resin molding 80 according to the present example was equal to or greater than 3.5, the unevenness was hardly visually recognized. If the kurtosis value (Sku) was equal to or greater than 3.5 and further the radius of curvature of the cross section of the base portion was equal to or less than 20 μm, the conspicuousness of the unevenness was more remarkably reduced.

Next, the condition that the kurtosis value (Sku) was 3.5, and the radius of curvature of the cross section of the base portion was 5.0 μm was set as condition A. The condition that the kurtosis value (Sku) was 4.0, and the radius of curvature of the cross section of the base portion was 10.0 μm was set as condition B. Further, the condition that the kurtosis value (Sku) was 5.0, and the radius of curvature of the cross section of the base portion was 20.0 μm was set as condition C. Then, the visibility of unevenness was evaluated when the width of the glossy portion was 0.05, 0.063, 1.4, 4.0, and 5.0 mm in each condition. Table 2 illustrates the results of the evaluations. Also in table 2, the visibility of unevenness for a resin molding 80 in which the unevenness was inconspicuous if the resin molding was not carefully observed, i.e., the visibility of unevenness was low is indicated as "Low". Further, the visibility of unevenness for a resin molding 80 in which the conspicuousness of the unevenness was more reduced than in a resin molding 80, the visibility of unevenness for which is indicated as "Low", i.e., the visibility of unevenness was further low is indicated as "Very low".

From table 2, it was found out that when the width of the glossy portion was equal to or greater than 0.063 mm and equal to or less than 4.0 mm, the conspicuousness of the unevenness was more remarkably reduced.

In the present example, the height of the non-glossy portion 82 was 50 μm. Also when the height was 40, 80, 100, and 500 μm, the results were the same. However, when the height was 40 μm, a fingerprint was easily left on the glossy portion 81. When the height was 500 μm, a region where the glossy portion 81 was visible when the plate-like resin molding 80 was viewed from a 60° direction was small, namely less than 80%, and thus the sense of luxuriousness was slightly reduced.

FIG. 8B is a top view of an exterior of a resin molding according to a second example. A polka-dot pattern was formed on a plate-like resin molding 83 having a thickness 1.6 mm. A width P between non-glossy portions 84 was 1.4 mm. A height of each non-glossy portion 84 was 50 μm. Further, a rib having a width of 0.8 mm was provided on a non-exterior surface of the resin molding 83.

Stainless steel was used as the material of a metal mold. The metal mold was processed using the machining center 90 illustrated in FIG. 9. The metal mold was roughly processed using a radius end mill having a diameter of 6 as the cutting tool 94 and subjected to mirror surface finishing using a rotary polishing tool and diamond paste. Then, a recessed portion having an inverted shape of each non-glossy portion 84 was processed in the metal mold using a ball end mill having a diameter of 0.4. The recessed portion was processed by scanning the ball end mill in a concentric circle, and the pitch of each scan in the radial direction was 50 μm.

After the metal mold was manufactured, injection molding was performed, thereby obtaining the resin molding 83. As the resin material, black HIPS was used.

As a result, the kurtosis value (Sku) of the non-glossy portion 84 of the resin molding 83 according to the present example was equal to or greater than 3.5. Further, the radius of curvature of the cross section of a base portion of the non-glossy portion 84 was equal to or less than 20 μm.

The exterior surface of the obtained resin molding 83 was visually observed by a person with normal eyesight to evaluate the visibility of unevenness occurring on the back of the rib. As a result, the unevenness was inconspicuous.

FIG. 8C is a top view of an exterior of a resin molding according to a third example. A snowflake pattern was formed on a plate-like resin molding 86 having a thickness 1.6 mm. The shortest distance P between non-glossy portions 87 was 3.3 mm. A width of the snowflake pattern was 0.5 mm, and a height of the snowflake pattern was 50 μm. Further, a rib having a width of 0.8 mm was provided on a non-exterior surface of the resin molding 86.

Stainless steel was used as the material of a metal mold. The metal mold was processed using the machining center 90 illustrated in FIG. 9. In the present example, the metal mold was roughly processed using a radius end mill having a diameter of 6 as the cutting tool 94 and subjected to mirror surface finishing using a rotary polishing tool and diamond paste. Then, a recessed portion having an inverted shape of each non-glossy portion 87 was processed in the metal mold using a ball end mill having a diameter of 0.4. The recessed portion was processed by two scans, and in each scan, the position of the tool was shifted by 50 μm in a direction perpendicular to the scanning direction.

After the metal mold was manufactured, injection molding was performed, thereby obtaining the resin molding 86. As the resin material, black HIPS was used.

As a result, the kurtosis value (Sku) of the non-glossy portion 87 of the resin molding 86 according to the present example was equal to or greater than 3.5, and the radius of curvature of a base portion of the non-glossy portion 87 was equal to or less than 20 μm.

The exterior surface of the obtained resin molding 86 was visually observed by a person with normal eyesight to evaluate the visibility of unevenness. As a result, the unevenness was inconspicuous.

TABLE 1

| Radius of curvature [μm] of base portion | Kurtosis value (Sku) | | | |
|---|---|---|---|---|
| | 3 | 3.5 | 4 | 5 |
| 2 | Low | Very low | Very low | Very low |
| 5 | Low | Very low | Very low | Very low |
| 10 | Low | Very low | Very low | Very low |
| 20 | Low | Very low | Very low | Very low |
| 30 | Low | Low | Low | Low |

TABLE 2

| | Width [mm] of flat portion | | | | |
|---|---|---|---|---|---|
| | 0.05 | 0.063 | 1.4 | 4 | 5 |
| A | Low | Very low | Very low | Very low | Low |
| B | Low | Very low | Very low | Very low | Low |
| C | Low | Very low | Very low | Very low | Low |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A resin molding comprising:
a first surface; and
a second surface,
wherein the first surface includes a glossy portion and a non-glossy portion, and the second surface includes a rib,
wherein the first surface has a repetitive pattern of a glossy surface and a non-glossy surface raised from the glossy surface,
wherein the glossy surface includes a high-glossy region having high glossiness and a low-glossy region having glossiness lower than the glossiness of the region having the high glossiness and higher than glossiness of the nonglossy surface, and the low-glossy region is formed on a back side of the rib,
wherein the non-glossy surface has a kurtosis value equal to or greater than 3.5, and
wherein a radius of curvature of a connecting portion to connect the non-glossy surface and the glossy surface is equal to or less than 20 μm.

2. The resin molding according to claim 1, wherein the glossiness of the high-glossy region is equal to or greater than 80%.

3. The resin molding according to claim 1, wherein the non-glossy surface is a curved surface.

4. The resin molding according to claim 1, wherein the non-glossy surface is raised from the glossy surface by more than 40 μm and less than 500 μm.

5. The resin molding according to claim 1, wherein a pitch of the non-glossy surface is equal to or greater than 0.063 mm and equal to or less than 4.0 mm.

6. The resin molding according to claim 1, wherein the repetitive pattern is a grid pattern.

7. A printer comprising:
a document platen cover,
wherein the document platen cover includes a first surface and a second surface,
wherein the second surface includes a rib,
wherein the first surface has a repetitive pattern of a glossy surface and a non-glossy surface raised from the glossy surface,
wherein the glossy surface includes a high-glossy region having high glossiness and a low-glossy region having glossiness lower than the glossiness of the region having the high glossiness and higher than glossiness of the nonglossy surface, and the low-glossy region is formed on a back side of the rib,
where the non-glossy surface has a kurtosis value equal to or greater than 3.5, and
wherein a radius of curvature of a connecting portion to connect the non-glossy surface and the glossy surface is equal to or less than 20 μm.

8. The printer according to claim 7, wherein the document platen cover contains acrylonitrile butadiene styrene (ABS) containing rubber particles and high impact polystyrene.

9. A manufacturing method of injecting rein into a cavity of a metal mold and manufacturing a resin molding including a first surface and a second surface,
wherein the second surface includes a rib,
wherein the first surface has a repetitive pattern of a glossy surface and a non-glossy surface raised from the glossy surface,
wherein the glossy surface includes a high-glossy region having high glossiness and a low-glossy region having glossiness lower than the glossiness of the region having the high glossiness and higher than glossiness of the nonglossy surface, and the low-glossy region is formed on a back side of the rib,
where the non-glossy surface has a kurtosis value equal to or greater than 3.5, and
wherein a radius of curvature of a connecting portion to connect the non-glossy surface and the glossy surface is equal to or less than 20 μm.

10. The manufacturing method according to claim 9, wherein the glossy surface is obtained by transferring a surface of a metal mold processed by using a rotary polishing tool and diamond paste onto a resin.

11. The manufacturing method according to claim 9, wherein the non-glossy surface is obtained by transferring a surface of a metal mold processed by using a ball end mill onto a resin.

12. The resin molding according to claim 3, wherein a kurtosis value of the curved surface is equal to or greater than 3.5.

13. The resin molding according to claim 3, wherein curvature of the curved surface is larger than curvature of the glossy surface.

* * * * *